W. ANDRUS & S. J. WALLACE.
Feed-Water Heaters for Steam-Generators.
No. 169,074.                    Patented Oct. 26, 1875.
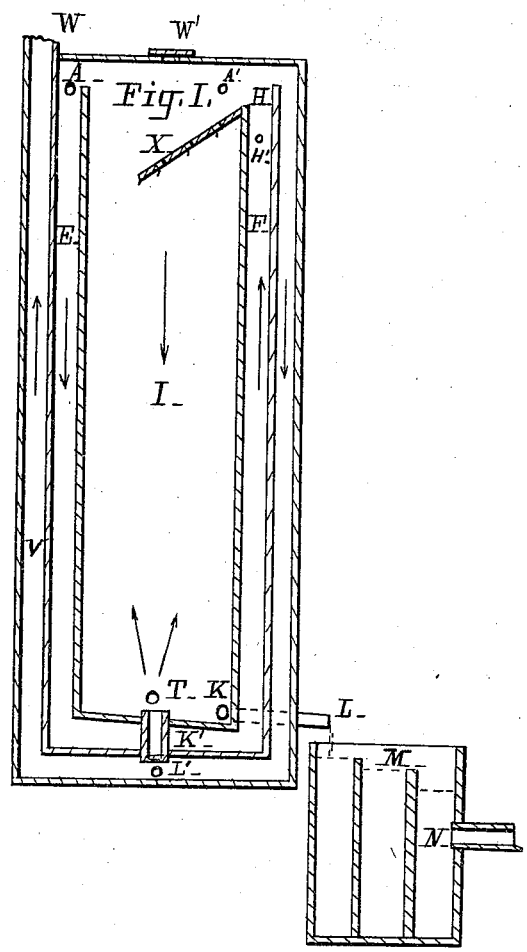

UNITED STATES PATENT OFFICE.

WILLIAM ANDRUS AND SAMUEL J. WALLACE, OF KEOKUK, IOWA.

IMPROVEMENT IN FEED-WATER HEATERS FOR STEAM-GENERATORS.

Specification forming part of Letters Patent No. 169,074, dated October 26, 1875; application filed March 25, 1875.

*To all whom it may concern:*

Be it known that we, WILLIAM ANDRUS and SAMUEL JACOB WALLACE, of Keokuk, Lee county, Iowa, United States of America, have invented a Process and Apparatus for Treating Feed-Water for Boilers and for other uses, of which the following is a specification:

This invention consists in an improved process and apparatus for treating feed-water for boilers, and for treating fluids for various other purposes. It is substantially as set forth hereinafter, referring to the accompanying drawings, in which—

Figure 1 is a vertical section of apparatus.

The apparatus is made of sheet or cast metal, with passages, &c., water-tight in all parts except the passages.

The water enters at A, and passes down the passage E and across the bottom, up passage F, and over the top, at H, into chamber I. These passages reach from top to bottom, and from side to side, to give extensive surface for heating the water flowing in a thin stream within. The water, after being heated in its circulation, flows over at top into chamber I, and is distributed over this by the inclined lip X, having perforations over it. The chamber I is filled with sticks, brush, and coarse grass, &c., and this delays the passage of the water down and keeps it divided into thin streams, running over the sticks, &c., so it may be fully exposed and brought into direct contact with steam for action on it. The water passes off from this chamber at pipe K L into an external settling-chamber, M, into which it falls in open view, so as to be readily seen as to quantity, regularity, and condition. This chamber M is separate and of capacity to allow the apparatus to run continuously, though the boiler may only be fed at intervals. It has vertical walls across it to varying heights, so the water will overflow from one to another for settling, &c. Steam from exhaust of engine or otherwise enters at T, and passes up through the mass in chamber I, heating and boiling the water passing down through it over the brush, &c. This carries off the carbonic acid and causes the lime and other insoluble matter to be thrown down, either in passing or in the settling-chamber outside. The steam passes over passage F at top and down a passage outside of it, across the bottom, and up on the other side, in contact with the walls of the water-passages and the outside walls. This heats the water preparatory to entering steaming-chamber I, and cools the steam, already cooled by heating the water, and evaporating it in chamber I, to condense it and the vapor carried by it. The steam then escapes at W. The condensed water, &c., is carried off separately by pipe L' for feeding the boiler or other uses.

The quantities of steam and water entering at T A are regulated by inlet-faucets to suit each other and the objects in view. By increasing the proportion of water the steam may be lowered in temperature in passing chamber I, so it may be almost or wholly condensed in the passages; or, the proportion of water may be so small passing through chamber I as to be almost or entirely evaporated. A separate outlet, H', which can be closed, is made for the water from passage F when it is desired to treat some other fluid in chamber I. In this case a separate inlet, A', is used for this fluid.

Various substances, as peppermint plants, chemicals, &c., are introduced into chamber I when it is desired to separate anything from them by distillation by steam, &c.

Salt water and other fluids, &c., may be passed through the apparatus and produce distilled water for steam-boilers, &c., and may be used to boil down to produce salt, &c. This may be regulated so the salt or other body desired is left in lower part of chamber I, while other matters, not desired in solution, drain off at K. For this purpose the lower portion of chamber I is left nearly or entirely empty to receive the deposit; or the flow is regulated so the deposit will mostly occur after passing off. Sugar-cane and other juices are run through and reduced to sirup in like way. For this purpose cloth or other filters are introduced at H, and one or more points below, through which the fluid will pass while the steam passes around. Additional steam and water passages are provided where desired.

We claim—

1. The feed-water purifier with the separate steam and water-passages E V, separated by thin walls, in combination with the inner chamber I, arranged to pass the steam and water through each other, substantially as set forth.

2. The combination, with chamber I, of the passage V with its separate outlet L′, arranged substantially as set forth.

3. The combination, with chamber I, of the passages E V and outlets L L′, arranged substantially as set forth.

4. The combination, with chamber I, of the passages E V, inlets T A A′, and outlets H′ L L′, substantially as set forth.

WILLIAM ANDRUS.
SAMUEL JACOB WALLACE.

Witnesses:
ERIE J. LEECH,
H. W. CLENDENIN.